United States Patent [19]

Chokshi et al.

[11] Patent Number: 5,663,219
[45] Date of Patent: Sep. 2, 1997

[54] LIGHTWEIGHT SEALANT HAVING IMPROVED PEEL STRENGTH

[75] Inventors: Kanu R. Chokshi, Crystal Lake; Keith B. Potts, Elgin, both of Ill.

[73] Assignee: Morton International, Inc., Chicago, Ill.

[21] Appl. No.: 533,295

[22] Filed: Sep. 25, 1995

Related U.S. Application Data

[63] Continuation-in-part of Ser. No. 250,217, May 27, 1994, abandoned.

[51] Int. Cl.$^6$ ............................... C08K 3/20; C08L 63/00
[52] U.S. Cl. ........................ 523/404; 523/428; 525/408; 525/409; 525/523; 525/524; 525/537
[58] Field of Search ......................... 523/404, 428; 525/408, 409, 523, 524, 537

[56] References Cited

U.S. PATENT DOCUMENTS

| | | | |
|---|---|---|---|
| 4,017,554 | 4/1977 | Villa | 260/830 S |
| 4,755,570 | 7/1988 | Hefner, Jr. | 525/529 |
| 5,143,999 | 9/1992 | Setiabudi et al. | 528/109 |

*Primary Examiner*—Helen Lee
*Attorney, Agent, or Firm*—Robert M. Didrick; Gerald K. White

[57] ABSTRACT

The peel strength of lightweight, liquid polysulfide-based sealants for aircraft is improved by the addition of an epoxy-terminated liquid polysulfide to the liquid polysulfide. The lightweight sealants have a specific gravity of from about 1 to about 1.3 and the amount of epoxide terminated polysulfide is from about 0.4 to about 5% of the weight of the polysulfide present in the sealant. Fillers having a specific gravity of from about 0.1 to about 2.2 are used.

8 Claims, No Drawings

LIGHTWEIGHT SEALANT HAVING IMPROVED PEEL STRENGTH

This is a continuation in part of application Ser. No. 08/250,217 filed on May 27, 1994, now abandoned.

BACKGROUND OF THE INVENTION

1. Field of the Invention

This invention relates to lightweight sealants such as are used in the manufacture of aircraft and other structures wherein weight is a critical factor in the use thereof. It relates more particularly to sealants for integral fuel tanks and fuel cell cavities. Still more particularly it relates to the problem of imparting satisfactory peel strength to lightweight polysulfide-based aircraft sealants containing fillers.

High density sealants such as are taught in U.S. Pat. No. 3,882,091 are useful in the construction industry because they generally have sufficient peel strengths for their intended purpose. Prior to this invention, however, the peel strength of low density aircraft sealants was not satisfactory for use on some substrates.

SUMMARY OF THE INVENTION

It is an object of this invention, therefore, to provide a lightweight sealant for aircraft which has an improved peel strength.

It is a related object of this invention to provide a lightweight, polysulfide-based sealant which has a satisfactory peel strength on metal, glass and various organic substrates.

These and other objects which will be apparent from the following description are achieved by a sealant composition having a specific gravity of from about 1 to about 1.3 and comprising a filler, a liquid polysulfide, and an epoxy-terminated liquid polysulfide.

DETAILED DESCRIPTION OF THE INVENTION

The liquid polysulfide resins suitable for use in the lightweight sealant of this invention are prepared by the condensation in aqueous suspension of sodium polysulfide with bis-(2-chloroethyl) formal and the branched polysulfides introduced by the incorporation at the manufacturing stage of up to about 2 mole percent of trichloropropane along with the bis-(2-chloroethyl)formal. The interspersal of —SCH$_2$CH$_2$ (CH$_2$SH)S-groups engendered by the trichloropropane provides for crosslinking when desired. The general structure of both is described by the formula

wherein m is from about 5 to about 50, n is from 0 to about 1 and n/m is from about 0.005 to about 0.02 when n is greater than 0. Both linear and crosslinked liquid polysulfides are described in U.S. Pat. Nos. 2,466,963 (Patrick et al); 2,789,958 Fettes et al); and 4,165,425 all of which are incorporated herein by reference. The preparation of the polysulfides is described also by E. R. Bertozzi in *Macromolecular Syntheses*, p.35, Vol. 7, E. M. Fettes, ed., John Wiley & Sons, Inc., New York, (1979). They are commercially available under the trademarks THIOKOL and LP from Morton International, Inc. and are exemplified by LP-2, LP-3, LP-12, LP-33, and LP-541. Preferably, the average molecular weight of the polysulfide is about 4000.

The lightweight fillers suitable for use in this invention may be organic, inorganic, or a composite of both. They fall within two categories—microspheres and amorphous fillers. The specific gravity of the microspheres ranges from about 0.1 to about 0.7 and are exemplified by polystyrene foam, microspheres of polyacrylates and polyolefins, and silica microspheres having particle sizes ranging from 5 to 100 microns and a specific gravity of 0.25 sold under the trademark ECCOSPHERES by W. R. Grace & Co. Other examples include alumina/silica (30:65)$_{wt}$ microspheres having particle sizes in the range of 5 to 300 microns and a specific gravity of 0.7 sold under the trademark FILLITE by Pluess-Stauffer International, aluminum silicate microspheres having a specific gravity of from about 0.45 to about 0.7 sold under the trademark Z-LIGHT, and calcium carbonate-coated polyvinylidene copolymer microspheres having a specific gravity of 0.13 which are sold under the trademark DUALITE 6001AE by Pierce & Stevens Corp.

The amorphous lightweight fillers have a specific gravity ranging from about 1.0 to about 2.2 and are exemplified by calcium silicates, fumed silica, precipitated silica, and polyethylene. Examples include calcium silicate having a specific gravity of from 2.1 to 2.2 and a particle size of from 3 to 4 microns sold under the trademark HUBERSORB HS-600 by J. M. Huber Corp., and fumed silica having a specific gravity of 1.7 to 1.8 with a particle size less than 1 micron sold under the trademark CAB-O-SIL TS-720 by Cabot Corp. Other examples include precipitated silica having a specific gravity of from 2 to 2.1 sold under the trademark HI-SIL T-7000 by PPG Industries, and polyethylene having a specific gravity of from 1 to 1.1 and a particle size of from 10 to 20 microns sold under the trademark SHAMROCK S-395 by Shamrock Technologies Inc. The amounts of the microspheric and amorphous lightweight fillers used in the lightweight sealant may be from about 0.3 to about 10% and from about 4 to about 15% of the total weight of the sealant, respectively.

For the purposes of this invention, an epoxy-terminated polysulfide is a polysulfide having an epoxy group linked to the polymer chain at each of two or more residual sulfhydryl sites. The epoxidation of one or a mixture of liquid polysulfides described above with a stoichiometric amount of an epichlorohydrin, dichlorohydrin, 1,2-dichloro-3-hydroxy propane, the diglycidyl ether of bisphenol A and/or bisphenol F, a di-glycidyl ether of glycerol, or a di-epoxylated novolac resin may be used to obtain the epoxy-terminated liquid polysulfide of this invention. The epoxidation of a liquid polysulfide in an excess of epichlorohydrin is described in U.S. Pat. No. 5,173,549, which is incorporated herein by reference. Morton International's ELP-3 and ELP-33, which are the epoxy-terminated derivatives of the LP-3 and LP-33 polysulfides, respectively, are typical of the epoxy-terminated polysulfides suitable for this invention.

The amount of such an epoxy-terminated polysulfide used to effect the improved peel strength of the polysulfide-based lightweight sealant of this invention is from about 0.4% to about 5% by weight of the liquid polysulfide present in the sealant.

The conventional curing agents or hardeners for polysulfide sealants are suitable for the lightweight sealant of this invention. A pasty mass made by mixing manganese dioxide with a plasticizer which is compatible with the polysulfide, e.g., a chlorinated paraffin, a hydrogenated terphenyl, or a phthalatetype plasticizer is an example. Substances which promote or retard the curing action ,such as a molecular sieve or stearic acid, may be present also in the curing paste. The proportion of polysulfide-based sealant composition to curing agent is from about 6:1 to about 10:1 by weight. There may be from about 50 to about 70 parts by weight of $MnO_2$ per 30 to 50 parts by weight of plasticizer in the paste. Accelerators such as sulfur, and tetramethylguanidine may be used.

Additional additives may also be present in the lightweight sealant of this invention. From about 10 to about 30%, by weight of the total sealant, of standard fillers having specific gravities much higher than the lightweight fillers described above may be present. Calcium carbonate (sp.g. of 2.7–2.95), for example, may be used as long as there is a sufficient amount of lightweight filler present to reduce the specific gravity of the sealant composition to about 1.3 or less. Reinforcing agents, extenders, flow control agents, and the like as would normally be employed by a skilled technician in the sealant art may be used in this invention.

In certain formulations within the scope of this invention, the adhesive strength is surprisingly good in the absence of adhesive additives such as a reactive silane as represented by Union Carbide's Silane A-187 and A-189, and phenolics such as METHYLON 75-108 are an option. Thus, silane-free, lightweight, polysulfide-based sealants which have satisfactory adhesion to most substrates are made possible by this invention. Such additives may be present, however, at levels ranging up to about 5% by weight.

The following examples illustrate the invention more specifically and are not intended to restrict the scope of the invention in any way. All parts are by weight unless otherwise indicated.

EXAMPLE 1

The following materials were mixed at room temperature in a ROSS power mixer at high shear to obtain a sealant of this invention having a specific gravity of 1.1.

| | |
|---|---|
| Polysulfide (LP-12C) | 71.10 |
| Sulfur | 0.02 |
| n-Decyl mercaptan | 0.18 |
| Phenolic adhesion promoter | 0.47 |
| Epoxy-terminated polysulfide (ELP-3) | 1.10 |
| Calcium carbonate | 15.91 |
| Strontium chromate | 5.00 |
| silane (A-187) | 0.30 |
| Toluene | 0.50 |
| Lightweight filler | 4.50 |
| | 99.26 |

The resulting composition was cured with a manganese dioxide curing agent sold by Eagle Picher as EP Type II at a weight ratio of 10 parts of the composition to one part of the curing agent and 0.21% tetramethylguanidine as a catalyst.

EXAMPLE 2

A sealant of this invention having a specific gravity of 1.3 was made according to the following formulation:

| | |
|---|---|
| Polysulfide (LP-12C) | 73.30 |
| Epoxy-terminated polysulfide (ELP-3) | 0.46 |
| Sulfur | 0.25 |
| Adhesion promoter | 0.69 |
| Calcium silicate (Av. particle size 3.2μ) | 4.81 |
| Polyethylene filler (Av particle size 18μ) | 6.87 |
| Fumed silica (CAB-O-SIL TS-720) | 3.66 |
| Silane (A-187) | 2.29 |
| Lightweight Filler | 0.32 |
| Toluene | 7.35 |
| | 100.00 |

The resulting composition was cured with a manganese dioxide curing agent sold by Eagle Picher as EP Type II at a weight ratio of 10 parts of the composition to one part of the curing agent.

CONTROL No. 1

A mixture of 4500 parts of LP-12 polysulfide, 462.5 parts of HUBERSORB 600 calcium silicate, and 37.5 parts of A-189 silane was milled to give composition having a Brookfield viscosity of 6000 poises with a No. 7 spindle at 2 rpm and 78° F. The lightweight filler content was 9.25% by weight.

EXAMPLES 3–5

ELP-3 epoxy-terminated polysulfide resin was added to 300 parts of a composition like the uncured composition of the No. 1 Control in various amounts as follows to obtain sealant compositions having a specific gravity of about 1.3:

Example 3 4.5 parts
Example 4 9.0.parts
Example 5 15 parts.

CONTROL NO. 2

A mixture of 1746.7 parts of LP-12 polysulfide, 180 parts of HI-SIL T-700 precipitated silica, and 14.5 parts of A-189 silane was milled to give composition having a Brookfield viscosity of 1400 poises with a No. 7 spindle at 2 rpm and 78° F. The lightweight filler content was 9.3% by weight.

EXAMPLES 6–8

ELP-3 epoxy-terminated polysulfide resin was added to 300 parts of a composition like the uncured composition of the No. 2 Control in various amounts to obtain sealant compositions having a specific gravity of about 1.3 as follows:

Example 6 4.5 parts
Example 7 9.0 parts
Example 8 15 parts.

CONTROL No. 3

A mixture of 720 parts of LP-12 polysulfide, 74 parts of HUBERSORB 250 calcium silicate, and 6 parts of A-189 silane was milled to give composition having a Brookfield viscosity of 1400 poises with a No. 7 spindle at 2 rpm and 78° F. The lightweight filler content was 9.25% by weight.

EXAMPLE 9

To 200 parts of the composition of control No. 3 there was added 10 parts of ELP-3 epoxy-terminated polysulfide resin.

CONTROL No.4

A mixture of 688 parts of LP-12 polysulfide, 106 parts of HUBERSORB 250 calcium silicate, and 6 parts of A-189 silane was milled to give composition having a Brookfield viscosity of 2300 poises with a No. 7 spindle at 2 rpm and 78° F. The lightweight filler content was 13.25% by weight.

EXAMPLE 10

To 200 parts of the composition of Control No. 4 there was added 10 parts of ELP-3 epoxy-terminated polysulfide resin.

EXAMPLES 11–13

ELP-3 epoxy-terminated polysulfide resin was added at various levels to three samples of a polysulfide-based sealant composition, each sample containing 400 parts of LP-12, 53 parts of HUBERSORB 600 calcium silicate (11.3% by weight of total) and 2.4 parts of METHYLON 75-108 adhesion promoter to obtain the products of Examples 11–13 having ELP-3 contents (parts per hundred of polysulfide-based sealant) as follows:

Example 11 1.5
Example 12 3.0
Example 13 5.0.

The product of each example had a Brookfield viscosity greater than 20,000 poises using a No.7 spindle at 2 rpm and 80° F.

Specimens for testing the peel strength and adhesive strength of the lightweight sealants of Examples 3–6 were made by applying a 0.125 inch thick layer of the sealant to a metal panel, coating about five inches of a 12 inch long aluminum foil strip with the same sealant, joining the coated panel and the coated portion of the strip, and curing the sealant at 72° F. for 1–2 weeks. Each sealant composition, with and without the epoxy-terminated polysulfide resin, was cured Eagle-Picher Type II curing agent. The ratio of the curing agent to the sealant composition is about 16 parts per 100 parts except as given in Table I.

TABLE I

| Ex. No. | 4 | 5 | 7 | 8 | 9 | C4 | 10 | 11 | 12 | 13 |
|---|---|---|---|---|---|---|---|---|---|---|
| Ratio | 15.6 | 15.3 | 15.6 | 15.3 | 15.3 | 15.3 | 14.6 | 15 | 14.8 | 14.5 |

The aluminum foil strips were cut longitudinally to provide individual strips for the peel test and the adhesive test. One end of the panel was clamped in the lower jaw of a tensile strength-type machine so that the test strips were vertical and the bare portion of one strip was placed in the upper jaw. The bare portion was pulled upward at a 180° angle at about 2 inches per minute and the cohesive strength of the sealant was measured by recording the load necessary for separation of the sealant from the surface of the panel. The maximum and the average cohesive strength of the sealants of Examples 3–11 and 14 are given in Table II, along with those of the control sealants having none of the epoxy-terminated polysulfide resin as an additive. The JRF peel strength is measured after the specimen has soaked in jet reference fuel at 140° F. for 1 week. The increase in elongation of the sealants of this invention is also shown in the table.

TABLE II

| Ex. No. | Shore A | Elongn. (R.T.) 1 week | Elongn. (R.T.) 2 week | Dry Peel Strength Max. | Dry Peel Strength Av. | JRF Peel Strength Max. | JRF Peel Strength Av. |
|---|---|---|---|---|---|---|---|
| 3 | 56 | 128 | 133 | 14.9 | 9.2 | 11 | 4.1 |
| 4 | 55 | 150 | 147 | 16.5 | 11.6 | 9 | 6.5 |
| 5 | 50 | 181 | 171 | 22.7 | 14.2 | 16.6 | 9 |
| C1 | 62 | 132 | 136 | 5.5 | 2.7 | — | — |
| 6 | — | — | — | 39.3 | 23.5 | 19.8 | 12.6 |
| 7 | — | — | — | 37.7 | 25.5 | 31.9 | 19.2 |
| 8 | — | — | — | 44.5 | 26.2 | 33 | 19.7 |
| C2 | — | — | — | 32.1 | 21.5 | 13.8 | 7 |
| 9 | 28 | 505 | 511 | 45.2 | 26.5 | 39.3 | 24.6 |
| C3 | 51 | 192 | 195 | 19.4 | 15 | 13.9 | 9.9 |
| 10 | 35 | 427 | 475 | 47 | 28.3 | 36.9 | 24.7 |
| C4 | 55 | 157 | 144 | 20.9 | 17.8 | 14 | 10 |
| 13 | 57 | 200 | 217 | 54.8 | 26.6 | 46.7 | 20.3 |

The adhesive strength of the sealants of Examples 11 and 12 was measured in the same manner as was the cohesive strength except that a knife cut is made through the sealant behind the strip and across the width of the test strip initially and at about 0.6 inch intervals as the strip is being peeled from the panel. The adhesive strength is shown in TABLE III.

TABLE III

| Ex. No. | Shore | Elongn (R.T.) 1 week | Elongn (R.T.) 2 weeks | Dry Adhesive Strength Max. | Dry Adhesive Strength Av. | JRF Adhesive Str. Max | JRF Adhesive Str. Av. |
|---|---|---|---|---|---|---|---|
| 11 | 61 | 225 | 315 | 39.2 | 10.2 | — | 2.7 |
| 12 | 57 | 207 | 238 | 49.5 | 10.7 | 32 | 5.7 |

EXAMPLES 14–18 and CONTROLS 5–7

The Control formulations given in TABLE IV are mixed with ELP-3 in the amounts indicated in Table V (parts by weight) to give the lightweight sealant compositions of Examples 14–18. The peel strengths of the Control formulations and of the products of Examples 14–18 are also given in Table V.

TABLE IV

| INGREDIENTS | Cont. 5 | Cont. 6 | Cont. 7 |
|---|---|---|---|
| LP-12 | 60.14 | 72.1 | 70.1 |
| N-decyl mercaptan | 0.11 | 0.18 | 0.18 |
| Adhesion promoter | 0.45 | 0.47 | 0.47 |
| Calcium carbonate | 24.5 | 15.91 | 15.91 |
| Strontium chromate | 5.0 | 5.0 | 5.0 |
| Silane A-187 | 0.6 | 0.3 | 0.3 |
| Toluene | 2.5 | 0.0 | 0.5 |
| DUALITE 6001 AE | 3.2 | 4.5 | 4.5 |
| Q-CEL 2135 silica | 3.5 | 0.0 | 0.0 |

66μ microspheres; density 0.28 g/cc

TABLE V

| EX. | C 5 | C 6 | C 7 | ELP-3 | Peel Strength (lbs) |
|---|---|---|---|---|---|
| 14 | 99.0 | — | — | 1.0 | 18.0 |
| 15 | 98.5 | — | — | 1.5 | 21.0 |
| 16 | 98.5 | — | — | 1.5 | 23.0 |
| C 5 | | | | | 14.6 |
| 17 | — | 98.5 | — | 1.5 | 38.5 |
| C 6 | | | | | 10–15 |
| 18 | — | — | 98.5 | 1.5 | 40.0 |
| C 7 | | | | | 10.8 |

COMPARATIVE EXAMPLES 1–5

A sealant having a specific gravity of 1.6 was made according to the following formulation:

| | |
|---|---|
| Polysulfide (LP-12) | 60.6 |
| Adhesion promoter | 0.45 |
| Calcium carbonate | 28.96 |
| Titanium dioxide | 3.8 |
| Silane (A-187) | 0.6 |
| Toluene | 5.6 |
| | 100.0 |

Various amounts of ELP-3 were added to separate samples of this high density sealant as shown in Table VI and each sample tested for peel strength and adhesive strength as described above. The curing agent for each sample was made up of 41.5 parts by weight of a hydrogenated terphenyl (HB-40), 56.1 parts of the EP Type II manganese dioxide paste, 0.73 part of tetramethylguanidine, and 1.67 parts of Rhodafac GB-520 wetting agent.

TABLE VI

| C. Ex. | ELP Level | Peel Strength |
|---|---|---|
| Control | None | 62.1 |
| 1 | 1.0% | 62.9 |
| 2 | 2.0% | 60.1 |
| 3 | 3.0% | 55.1 |
| 4 | 4.0% | 38.6 |
| 5 | 5.0% | 36.5 |

While the above description constitutes the preferred embodiments of the present invention, it will be appreciated that the invention is susceptible to modification, variation and change without departing from the proper scope and fair meaning of the accompanying claims.

The subject matter claimed is:

1. A sealant composition having a specific gravity of from about 1 to about 1.3 and a peel strength of at least about 17 pounds per linear inch, said composition comprising a filler, a liquid polysulfide having the formula:

$$HSCH_2CH_2OCH_2OCH_2CH_2S[SCH_2CH_2OCH_2OCH_2CH_2S]_m[-SCH_2CH[SH]CH_2S-]_nSCH_2CH_2OCH_2O-CH_2SH$$

wherein m is from about 5 to about 50, n is from 0 to about 1 and n/m is from about 0.005 to about 0.02 when n is greater than 0 and an epoxy-terminated adduct of an epoxy resin and said polysulfide.

2. The sealant of claim 1 wherein the filler has a specific gravity of from about 0.1 to about 2.2.

3. The sealant of claim 1 wherein the amount of epoxy-terminated polysulfide is from about 0.4% to about 5% by weight of the polysulfide.

4. The sealant of claim 1 wherein the filler has a specific gravity of from about 0.1 to about 0.7.

5. The sealant of claim 4 wherein the amount of filler is from about 0.3% to about 10% of the total weight.

6. The sealant of claim 2 wherein the filler has a specific gravity of from about 1 to about 2.2.

7. The sealant of claim 6 wherein the amount of filler is from about 4% to about 15% of the total weight.

8. The sealant of claim 2 wherein the filler is a mixture of microspheres and an amorphous lightweight filler.

* * * * *

UNITED STATES PATENT AND TRADEMARK OFFICE
CERTIFICATE OF CORRECTION

PATENT NO. : 5,663,219  
DATED : September 2, 1997  
INVENTOR(S) : Chokshi et al.

Page 1 of 2

It is certified that error appears in the above-indentified patent and that said Letters Patent is hereby corrected as shown below:

```
Col. 2, Ln. 64, correct "phthalatetype" to read
        -- phthalate type -- .
Col. 3, Ln. 43, correct "silane" to read -- Silane -- .
Col. 4, Ln. 28, correct "Example 3 4.5 parts" to read
        -- Example 3     4.5 parts -- .
Col. 4, Ln. 29, correct "Example 4 9.0.parts" to read
        -- Example 4     9.0 parts -- .
Col. 4, Ln. 30, correct "Example 5 15 parts." to read
        -- Example 5     15 parts. -- .
Col. 4, Ln. 48, correct "Example 6 4.5 parts" to read
        -- Example 6     4.5 parts -- .
Col. 4, Ln. 49, correct "Example 7 9.0 parts" to read
        -- Example 7     9.0 parts -- .
Col. 4, Ln. 50, correct "Example 8 15 parts." to read
        -- Example 8     15 parts. -- .
Col. 5, Ln. 22, correct "Example 11 1.5" to read
        -- Example 11    1.5 -- .
Col. 5, Ln. 23, correct "Example 12 3.0" to read
        -- Example 12    3.0 -- .
```

UNITED STATES PATENT AND TRADEMARK OFFICE
CERTIFICATE OF CORRECTION

PATENT NO. : 5,663,219
DATED : September 2, 1997
INVENTOR(S) : Chokshi et al

It is certified that error appears in the above-identified patent and that said Letters Patent is hereby corrected as shown below:

Col. 5, line 24, correct "Example 13 5.0." to read --Example 13 5.0. --.

Col. 6, line 63, correct "DUAIITE" to read --DUALITE--.

Signed and Sealed this

Fifth Day of January, 1999

Attest:

*Attesting Officer*

*Acting Commissioner of Patents and Trademarks*